United States Patent
Redford (10) Patent No.: US 10,009,760 B2
(45) Date of Patent: Jun. 26, 2018

(54) PROVIDING NETWORK CREDENTIALS (71) Applicant: Huawei Technologies Co., Ltd., Shenzhen (CN)

(72) Inventor: John Redford, Cambridge (GB)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days. days.

(21) Appl. No.: 14/694,238

(22) Filed: Apr. 23, 2015

(65) Prior Publication Data

US 2015/0312758 A1 Oct. 29, 2015

(30) Foreign Application Priority Data

Apr. 25, 2015 (GB) .................................. 1407361.3

(51) Int. Cl.
*H04W 12/04* (2009.01)
*H04W 60/00* (2009.01)
*H04W 4/50* (2018.01)
*H04W 4/60* (2018.01)

(52) U.S. Cl.
CPC ............. *H04W 12/04* (2013.01); *H04W 4/50* (2018.02); *H04W 4/60* (2018.02)

(58) Field of Classification Search
CPC ..... H04W 12/04; H04W 4/001; H04W 4/003; H04W 60/00
USPC .................................................. 455/410–411
See application file for complete search history.

(56) References Cited

U.S. PATENT DOCUMENTS

| 7,289,805 | B2 * | 10/2007 | Tom ........................ H04W 8/26 455/432.1 |
| 9,179,295 | B2 * | 11/2015 | Mohammed ........ H04L 63/0428 |
| 9,219,607 | B2 * | 12/2015 | Nakhjiri .................. H04L 9/321 |
| 9,532,211 | B1 * | 12/2016 | Sumner ................. H04W 8/245 |
| 9,532,215 | B2 * | 12/2016 | Webb ..................... H04W 12/06 |
| 9,641,327 | B2 * | 5/2017 | Nix .................... H04W 52/0235 |
| 2008/0260149 | A1 * | 10/2008 | Gehrmann ......... G06Q 20/3821 380/247 |
| 2008/0261561 | A1 * | 10/2008 | Gehrmann ............ H04W 8/205 455/411 |

(Continued)

OTHER PUBLICATIONS

Confidential Weightless™ SIG, Weightless Core Specification, Apr. 3, 2013, 619 pp.

(Continued)

*Primary Examiner* — Khawar Iqbal
(74) *Attorney, Agent, or Firm* — Slater Matsil, LLP (57) ABSTRACT

A method for providing a communication device with credentials to enable it to access communication resources provided by a network operator, the method comprising storing, on the communication device, an indication of (i) an identity associated with the communication device; and (ii) an identity associated with a provisioning agent, transmitting, from the communication device to a communication network, a registration request that identifies the communication device and the provisioning agent, the provisioning agent providing, in response to the registration request, credentials to enable the communication device to access communication resources provided by a network operator and transmitting said credentials from the communication network to the communication device.

17 Claims, 5 Drawing Sheets

(56) References Cited

U.S. PATENT DOCUMENTS

| | | | | |
|---|---|---|---|---|
| 2009/0119754 A1* | 5/2009 | Schubert | H04L 63/0853 | 726/4 |
| 2009/0253409 A1* | 10/2009 | Slavov | H04L 63/0823 | 455/411 |
| 2010/0311468 A1* | 12/2010 | Shi | H04W 4/003 | 455/558 |
| 2011/0035584 A1* | 2/2011 | Meyerstein | H04W 8/265 | 713/155 |
| 2011/0161659 A1 | 6/2011 | Himawan et al. | | |
| 2011/0305338 A1* | 12/2011 | Rogan | H04W 12/02 | 380/270 |
| 2011/0306318 A1 | 12/2011 | Rodgers et al. | | |
| 2013/0012168 A1* | 1/2013 | Rajadurai | H04L 9/0822 | 455/411 |
| 2013/0185560 A1* | 7/2013 | Eld | H04L 9/12 | 713/168 |
| 2013/0267199 A1* | 10/2013 | Kamal | H04L 63/0853 | 455/410 |
| 2013/0269011 A1* | 10/2013 | Wilson | H04L 63/08 | 726/6 |
| 2013/0275556 A1* | 10/2013 | Hjelm | H04L 63/126 | 709/217 |
| 2013/0281058 A1* | 10/2013 | Obaidi | H04L 9/28 | 455/411 |
| 2013/0305330 A1* | 11/2013 | Palanigounder | H04L 63/062 | 726/6 |
| 2013/0326603 A1* | 12/2013 | Kato | H04L 9/0866 | 726/6 |
| 2014/0141763 A1* | 5/2014 | Suh | H04W 4/001 | 455/418 |
| 2014/0148162 A1* | 5/2014 | Maharaj | H04M 15/751 | 455/435.2 |
| 2014/0220929 A1* | 8/2014 | Ekberg | H04L 12/1457 | 455/406 |
| 2014/0248854 A1* | 9/2014 | Schell | H04L 63/062 | 455/411 |
| 2014/0281493 A1* | 9/2014 | Nakhjiri | H04L 9/321 | 713/155 |
| 2014/0365769 A9* | 12/2014 | Eld | H04L 9/12 | 713/168 |
| 2015/0097669 A1* | 4/2015 | Li | G08B 5/222 | 340/539.13 |
| 2015/0350881 A1* | 12/2015 | Weiss | H04W 4/001 | 455/558 |
| 2015/0373206 A1* | 12/2015 | Mohammed | H04M 15/70 | 455/406 |
| 2016/0050555 A1* | 2/2016 | Mohammed | H04L 63/0428 | 455/406 |
| 2016/0094931 A1* | 3/2016 | Urbanek | H04W 8/20 | 455/418 |

OTHER PUBLICATIONS

GSM Association, Remote Provisioning Architecture for Embedded UICC Technical Specification, Version 1.0, Dec. 17, 2013, 294 pp.

Laganier et al., An IPv6 Prefix for Overlay Routable Cryptographic Hash Identifiers Version 2 (ORCHIDv2), Dec. 2013, 12 pp.

Moskowitz et al., Host Identity Protocol Version 2 (HIPv2), Oct. 2013, 127 pp.

Ofcom, Reprogrammable SIMs: Technology, Evolution and Implications (Final Report), Sep. 25, 2012, 95 pp.

Open Mobile Alliance (OMA), Lightweight Machine to Machine Architecture, Candidate Version 1.0, Dec. 10, 2013, 12 pp.

Open Mobile Alliance (OMA), Lightweight Machine to Machine Requirements, Candidate Version 1.0, Dec. 10, 2013, 15 pp.

Open Mobile Alliance (OMA), Enabler Release Definition for LightweightM2M, Candidate Version 1.0, Nov. 26, 2014, 15 pp.

Open Mobile Alliance (OMA), Lightweight Machine to Machine Technical Specification, Candidate Version 1.0, Nov. 26, 2014, 112 pp.

* cited by examiner

PROVIDING NETWORK CREDENTIALS

CROSS-REFERENCE TO RELATED APPLICATIONS

This application claims priority to UK Patent Application No. 1407361.3 titled "Providing Network Credentials," which was filed on Apr. 25, 2014. The disclosure of the foregoing application is incorporated herein by reference in its entirety.

TECHNICAL FIELD

This invention relates to provisioning a communication device with network credentials that will enable it to access communication resources offered by a network operator.

BACKGROUND

A subscriber identity module (SIM) is used to store information that is used to identify and authenticate subscriber devices within a communication network. Typically, a SIM is an integrated circuit (or 'chip') embedded within a card known as a SIM card. A SIM card is often removable so that a user can use it with different subscriber devices and still be identifiable to a network. SIM cards are often found in mobile devices such as mobile phones, smartphones, tablets etc.

Mobile network operators tend to use SIM cards to control access to their networks and to provide the basis for secure communications over the network. A user wishing to access services provided by a network operator can purchase a SIM card from the network operator. If a user wishes to change which network operator they use then they are typically required to purchase a new SIM card from the new network operator. In some scenarios a user can obtain access to services from network operators other than the operator that issued their SIM card if the network operators have roaming arrangements with each other.

It is becoming increasingly desirable for machines to be able to communicate with each other so as to enable machine-to-machine (M2M) communication. An example of such a network is the so-called "Internet of Things". Each machine within the network is preferably uniquely identifiable. In order to allow communication terminals to be deployed in large numbers inside a wide array of 'things', it is desirable that the cost of each terminal (including the entire endpoint radio module) be as low as possible. This focus on low-cost terminals may a barrier from using existing-style SIM cards within each terminal.

One option to reduce the cost of a terminal is to embed the SIM chip into the terminal so that the SIM is no longer in the form of a removable card. An example of this approach is the embedded universal integrated circuit card (eUICC) developed by the GSM Association (GSMA). This approach can reduce the cost of a terminal; however, it has not yet led to a cost reduction that is sufficient for ultra-low cost terminals such as those wanted to implement the Internet of Things.

Another approach is to simulate the function of a SIM chip in software. This approach has the potential to result in suitably low cost and secure systems, but there remain many problems, which have prevented it from gaining widespread acceptance. For example, there remain difficulties in simulating the full functionality of present day SIMs, with existing SIM chips providing a level of functionality which is substantially greater than that needed for just security functions. Additionally, a difficulty can arise in managing the remote provisioning of network service. The eUICC, for example, requires initial bearer details to be installed on each terminal at manufacture, which may complicate the manufacture process and reduces flexibility for the owner of the terminal. Furthermore, because the SIM chip is simulated in software within the terminal, there can be a difficulty of scaling the management and remote provisioning of network service due to the implied commercial and/or technical links between the hardware manufactures (e.g. the terminal manufacturer) and the network operators. There is therefore a need for an improved approach for providing a communication terminal with network credentials.

SUMMARY OF INVENTION

According to the present disclosure there is provided a method for providing a communication device with network credentials to enable it to access communication resources provided by a network operator, the method comprising: storing, on the communication device, an indication of (i) an identity associated with the communication device; and (ii) an identity associated with a provisioning agent; transmitting, from the communication device to a communication network, a registration request that identifies the communication device and the provisioning agent; the provisioning agent providing, in response to the registration request, network credentials to enable the communication device to access communication resources provided by a network operator; and transmitting said network credentials from the communication network to the communication device.

The method may comprise storing a public key of the communication device as the identity associated with the communication device.

The method may further comprise the provisioning agent encrypting said network credentials using the public key of the communication device.

The method may comprise storing a private key of the communication device on the communication device.

The method may comprise storing a public key of the provisioning agent as the indication of the identity associated with the provisioning agent.

The method may comprise storing a private key of the provisioning agent on the provisioning agent.

The method may comprise the communication device and the provisioning agent establishing a secure communications channel between them and the provisioning agent transmitting the network credentials over that secure communications channel.

The method may further comprise the communication device applying a one-way mathematical function to the indication of its identity so as to generate an identifier of the communication device for inclusion in the registration request.

The method may further comprise the communication device encrypting the identifier of the communication device using the public key of the provisioning agent for inclusion in the registration request.

The method may further comprise the communication device applying a one-way mathematical function to the indication of the identity associated with the provisioning agent so as to generate an identifier of the provisioning agent for inclusion in the registration request.

The method may comprise the provisioning agent providing the credentials in response to a request from a communication network that is not operated by the network operator.

The method may further comprise the provisioning agent identifying one or more network operators from which the communication device is permitted to access communication resources in dependence on an identifier of the communication device included in the registration request.

The method may comprise the communication device transmitting the registration request at a time when there are no network credentials stored on the communication device.

The method may comprise storing the identity associated with the communication device and the identity of the provisioning agent so as to form a soft subscriber identity module (SIM).

According to a second aspect of the present disclosure there is provided a communication device comprising: a memory storing an indication of (i) an identity associated with the communication device; and (ii) an identity associated with a provisioning agent; a communication unit configured to transmit, to a communication network, a registration request that identifies the communication device and the provisioning agent; and a provisioning unit configured to store network credentials received from the communication network in response to the registration request and thereafter use said network credentials to access communication resources of a network operator associated with those network credentials.

The memory may be configured to store a public key of the communication device as the indication of the identity associated with the communication device.

The memory may be configured to store a private key of the communication device.

The memory may be configured to store a public key of the provisioning agent as the indication of the identity associated with the provisioning agent.

The communication device may comprise an encryption unit configured to encrypt communications for the provisioning agent using the provisioning agent's public key.

The communication device may comprise an encryption unit configured to decrypt communications from the provisioning agent using the communication device's private key.

The communication device may comprise an encryption unit configured to establish a secure communications channel with the provisioning agent.

The communication device may comprise an encryption unit configured to apply a one-way mathematical function to the identity associated with the communication device that is stored in the memory so as to generate an identifier of the communication device for inclusion in the registration request.

The encryption unit may be configured to encrypt the identifier of the communication device using the provisioning unit's public key for inclusion in the registration request.

The encryption unit may be configured to apply a one-way mathematical function to the identity associated with the provisioning unit that is stored in the memory so as to generate an identifier of the provisioning unit for inclusion in the registration request.

The communication device may be configured to transmit the registration request at a time when there are no network credentials stored on the communication device.

The memory may store the indication of the identity associated with the communication device and the identity of a provisioning agent to form a soft subscriber identity module (SIM).

The communication device may be configured to store the indication of (i) an identity associated with the communication device; and (ii) an identity associated with a provisioning agent in one-time-programmable memory.

The communication device may be configured to store the credentials and/or identifiers derived from the indications of the identities associated with the communication device and the provisioning unit in non-one-time-programmable memory.

According to a third aspect of the present disclosure there is provided a provisioning agent for providing a communication device with network credentials to enable it to access communication resources provided by a network operator, the provisioning agent comprising: a client interface configured to receive, from a client associated with one or more communication devices, an indication of one or more network operators from which those communication devices are to be able to access communication resources; a database configured to associate each of the communication devices with an indication of the one or more network operators from which each communication device is able to access communication resources; and a provisioning unit configured to provide network credentials for installing on one or more of the communication devices so as to enable those communication devices to access communication resources from the network operators with which they are associated.

The provisioning unit may be configured to provide credentials in response to a request from a communication network.

The provisioning unit may be configured to provide credentials in response to a request from a communication network that has received a registration request from one of the communication devices.

The database may be configured to store a public key associated with each communication device.

The provisioning unit may be configured to encrypt the credentials for a particular communication device using the public key associated with that communication device.

The provisioning unit may be configured to establish a secure communications channel with a communication device and to transmit network credentials for installing on that communication device over that secure communications channel.

BRIEF DESCRIPTION OF THE DRAWINGS

The present disclosure will now be described by way of example with reference to the accompanying drawings. In the drawings.

DETAILED DESCRIPTION

A communication device that communicates over a communication network may need network credentials to be able to do so. For example, each device may need to be authenticated by the network in some way so as to limit network access to devices that are associated with some pre-existing contract with the network operator. The effect can be, for example, to limit network access to devices who have pre-purchased access or are associated with a pre-existing billing contract between the owner of the device and the network operator.

Network credentials and device identifiers are typically stored within the device. For example, in some devices, information is stored in a subscriber identity module (SIM). The SIM may take a physical form (e.g. a removable SIM card) or a 'soft' or virtual form, in which a physical SIM is effectively simulated by software.

Some SIMs are non-configurable in that they are associated with a particular network operator for the duration of the SIMs lifetime. If the owner of the communication device wishes to change the network the device receives service from, the owner will have to replace the SIM with a SIM from the new network operator.

Other SIMs may be configurable in that it is possible to remotely provision network credentials to the device, allowing an owner of the device to change network operator without having to replace any part of the device.

Existing provisioning mechanisms require network credentials of an initial network operator to be installed on the device during the manufacturing stage. For example in the case of a SIM card, network credentials of an initial network need to be installed during the manufacture of the SIM card, or in the case of a soft SIM, during the manufacture of the chip in which the SIM is embedded as software. As mentioned above, requiring that network credentials be installed during manufacture can add to the complexity of the chip being manufactured, and can also cause constraints in flexibility due to the required ties between the network operator and the chip manufacturer.

A communication device may be provided with network credentials to enable it to access communication resources provided by a network operator without having to install any network credentials during the manufacturing stage. Instead, the device may have stored thereon an identity of a provisioning agent with which the device is associated. The provisioning agent, which may operate independently of any network operator, may be configured to provide the communication device with suitable network credentials on request. The provisioning agent may either generate these network credentials or receive them from the network operator. The network credentials preferably include whatever information is required for the device to be able to authenticate itself with the network operator's network and thereby access communication resources provided by a network operator. In one example the device may comprise a virtual SIM. The provisioning mechanisms described herein may be particularly suitable for virtual SIMs as relatively little information needs to be held on the SIM.

It should be noted that throughout the description and the figures, like elements have been denoted by like reference numerals.

Figure 1:
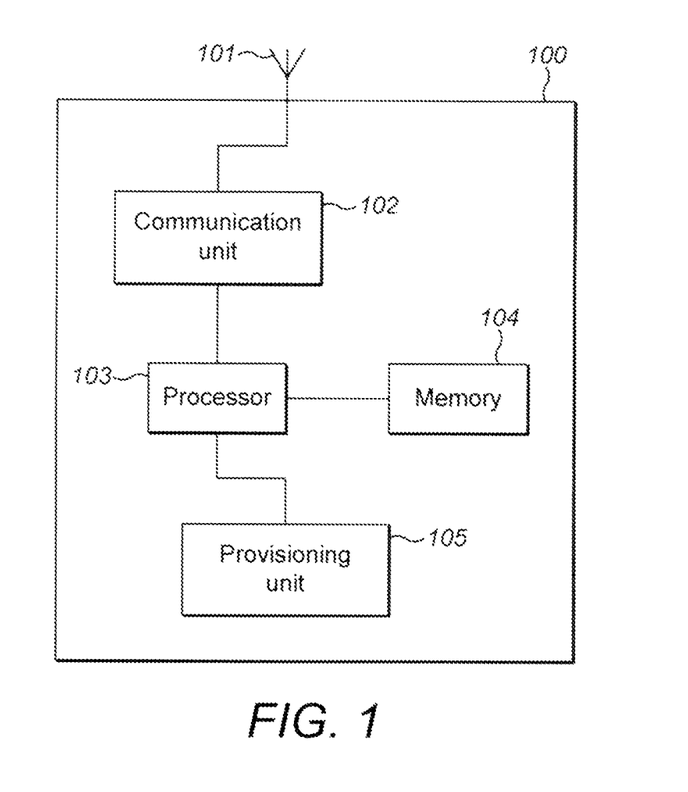
FIG. 1 shows an example of a communication device.

FIG. 1 shows an example of a communication device 100. The communication device is configured for wireless communication. It comprises an antenna 101 and a communication unit 102. The communication unit may handle any processing required to send and receive communications over the air interface. The communication device suitably uses the antenna and communication unit to communicate with at least one other communication device in a network according to a communications protocol. It also includes a processor 103, a memory 104 and a provisioning unit 105. The provisioning unit may be configured to store network credentials and use those network credentials to access the communication resources of a network. The processor 103 is capable of executing a set of program instructions that are stored in non-transitory form in memory 104. The processor 103 could be a microprocessor. Memory 104 could be part of processor 103 or connected via a bus.

The structures shown in FIG. 1 (and indeed all block apparatus diagrams included herein) are intended to correspond to a number of functional blocks in an apparatus. This is for illustrative purposes only. FIG. 1 is not intended to define a strict division between different parts of hardware on a chip or between different programs, procedures or functions in software. In some embodiments, some or all of the procedures described herein may be performed wholly or partly in hardware. In some implementations, the communication unit and provisioning unit (for example) may be implemented by a processor acting under software control (e.g. the processor shown in FIG. 1 or a more general CPU of a communication device). Any such software is preferably stored on a non-transient computer readable medium, such as a memory (RAM, cache, FLASH, ROM, hard disk etc.) or other storage means (USB stick, FLASH, ROM, CD, disk etc).

Figure 2:
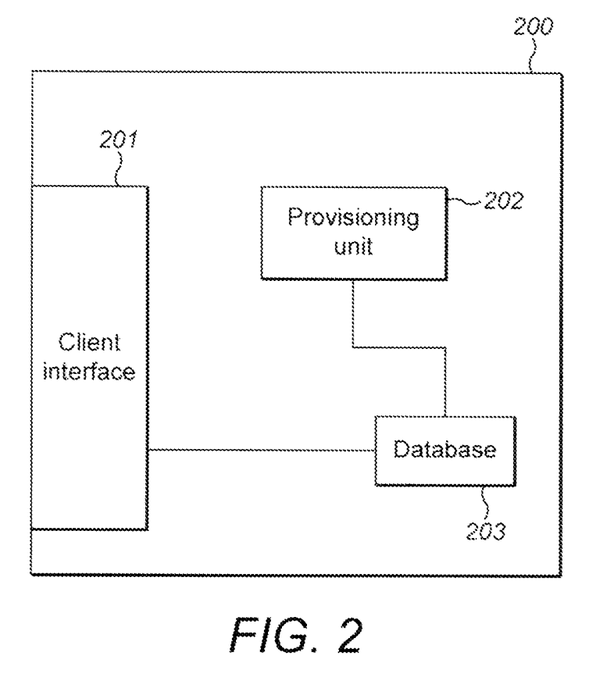
FIG. 2 shows an example of a provisioning agent.

FIG. 2 shows an example of a provisioning agent 200. The provisioning agent comprises a client interface 201, a provisioning unit 202 and a database 203. The provisioning agent could further comprise an antenna to enable communication with one or more communication devices and for wireless communication with a network more generally. In many embodiments, however, it is likely that the provisioning agent will have a wired connection to the communication network which then communicate with the communication device over the air interface on the provisioning agent's behalf. The provisioning unit could be embodied by hardware, or alternatively in software stored in non-transitory form in a non-volatile memory. The database could also be stored in non-transient form in a non-volatile memory. The provisioning agent could comprise one or more processors for executing instructions stored in the memory in order to carry out any functionality of the agent. The provisioning agent may be implemented by a general computing apparatus, such as a server. The provisioning agent may be implemented as part of the cloud. The provisioning agent may form part of a communication network (e.g. as part of the core network) or may operate outside of the communication network. Preferably the provisioning agent is a trusted third party both to one or more network operators and customers of those network operators.

Figure 3:
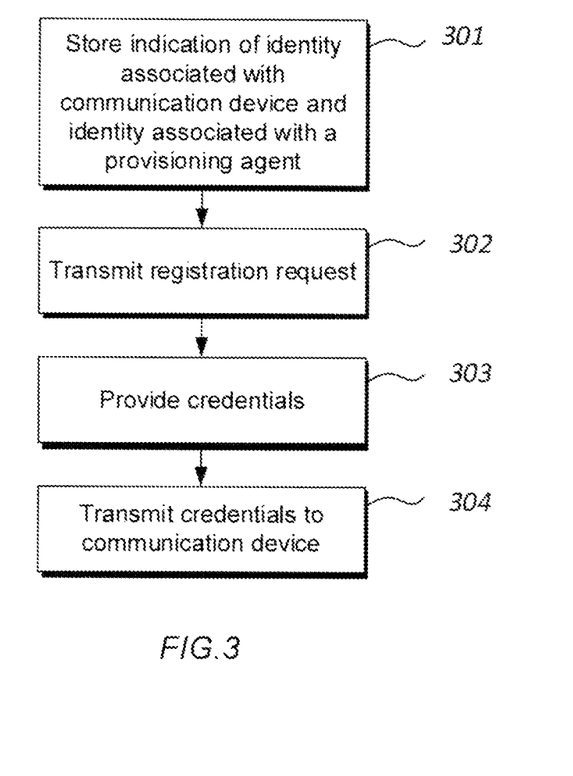
FIG. 3 shows a flow-chart of a method of providing a communication device with network credentials.

A method is described below and with reference to FIG. 3 for providing a communication device with network credentials to enable it to access communication resources provided by a network operator. First, an indication of an identity associated with the communication device and an indication of an identity of a provisioning agent are stored on the communication device (301). The indications could, for example, be stored in memory 104. Next, the communication device transmits a message in the form of a registration request to a communication network. The registration request preferably identifies both the communication device and the provisioning agent (302). Although the communication device is not in possession of network credentials at this stage, the communication network is nonetheless prepared to allow the initial registration message and the reply from the provision agent to pass across the network. The communication device is, however, at this stage unable to access other services of the communication network due to its lack of network credentials.

At 303, the provisioning agent provides, in response to the registration request, network credentials that enable the communication device to access communication resources provided by a network operator. The network operator may operate a different network from that which receives the registration request. At 304, the network credentials are transmitted from the communication network to the communication device to enable the communication device to access network resources provided by the network operator.

Figure 4:
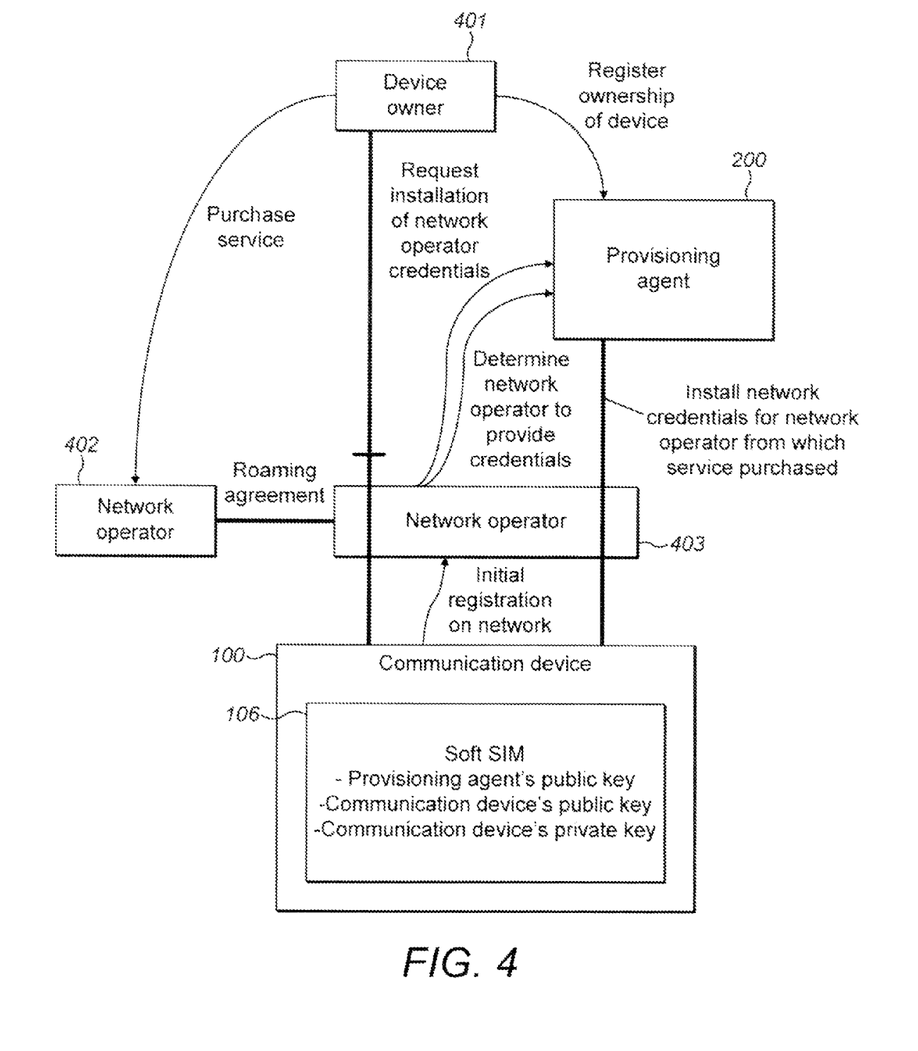
FIG. 4 shows an example of a network of entities used in providing a communication device with network credentials.
Figure 5:
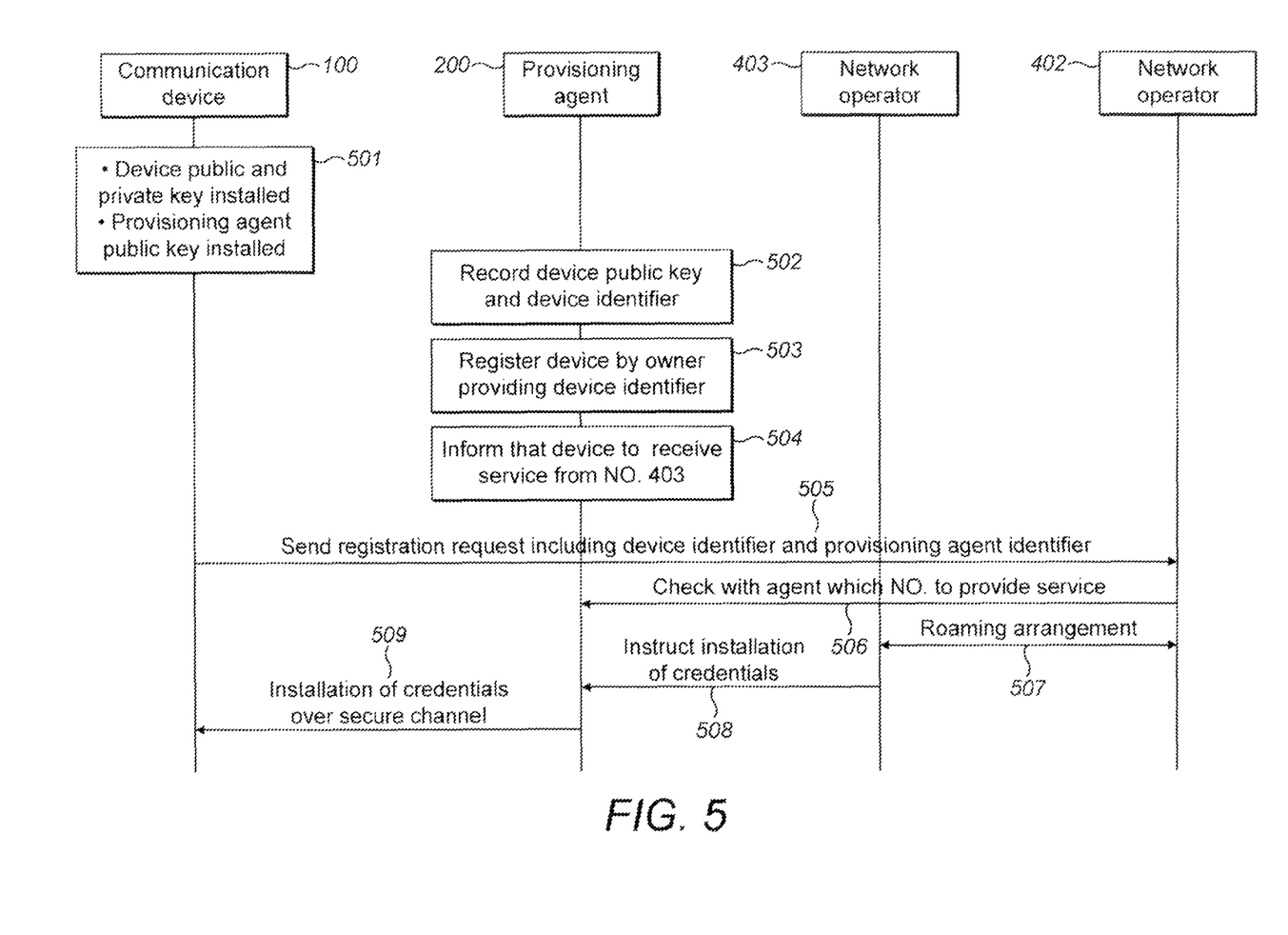
FIG. 5 shows an illustration of the steps performed by the entities during the provision of network credentials at a communication device.

FIG. 4 shows a schematic example of a communication network to illustrate how network credentials may be provided to a communication device. Shown are a communication device 100, a provisioning agent 200, a device owner 401 and network operators 402 and 403. The lines between these different entities are used to illustrate communication between the entities. FIG. 5 illustrates an exemplary flow chart of events during the provision of network credentials to the communication device.

Communication device 100 can have stored in its memory an indication of an identity associated with the device 100 and an indication of an identity of provisioning agent 200. This information can be stored on the device during manufacture. For example, this information can be stored on a chip that is to be used in the device. The indication of the identity associated with the communication device could be in the form of one or more keys, such as a public key of the device. The indication of the identity of the provisioning agent 200 could also be in the form of a public key, but this time of the provisioning agent. In order to enhance security, this information is preferably stored in secure memory, such as one-time programmable (OTP) memory, at the time of chip manufacture (shown at 501). This information, stored in memory, may form part of a soft (or virtual) SIM of the device. The communication device may not be provided with any network credentials at manufacture time.

The public key of the communication device is preferably recorded by the provisioning agent 200 in its database 203 (shown at 502). This suitably takes place at manufacture time. The provisioning agent may manage network credentials for many devices. A unique identifier for each device could also be stored in database 203. The process of placing keys on the chip and recording the details of the chip in the database of the provisioning agent should be done in a secure fashion. A company that is responsible for operating the provisioning agent may be responsible for the security of this process. The keys stored at the database could be 256-bit raw keys that use elliptic cryptography.

A unique identifier is then generated for the communication device. The unique identifier is preferably relatively short and of fixed length. In one example the unique identifier could be generated from a one-way mathematical function using indication of the device's identity as an input. In one example, the unique identifier is generated using a secure one-way hash function of the device's public key. This might be done, for example, using the process described in the Internet Host Identity Protocol (HIP) draft standard. This generates a valid 128-bit IPv6 address. Similarly, the communication device can generate an IPv6 address for the provisioning agent using the HIP hash function of the agent's public key. The process of generating unique identifiers for the communication device and provisioning agent can be performed by respective encryption units (not shown in FIGS. 1 and 2).

Generating the unique identifiers from the public keys in this way can have the advantage of not requiring any additional OTP storage on the communication device because only the public key needs to be stored. The generated identifiers might be stored in some other (less expensive) memory (i.e. memory that is not OTP) or may be generated as and when required by the communication device. This reduces the use of costly OTP cells which in turn could reduce the cost of the manufactured chip making it suitable for lost-cost implementations such as M2M communication. In addition, it can also have the advantage of cryptographically tying the identifier to the communication device, rather than requiring a separate device identifier to be uniquely assigned to the device.

Because the device's public key is stored at the provisioning agent, and the provisioning agent's public key is stored at the communication device, both the communication device and the provisioning agent can generate each other's unique identifiers.

In order to secure communications between the communication device and the provisioning agent, data transmitted therebetween may be encrypted. The communication device may comprise an encryption unit to perform this encryption for messages to be transmitted to the agent and to perform decryption for messages received from the agent. Messages transmitted between the provisioning agent and communication device could be encrypted using their respective public and private keys. For example, the communication device's encryption unit could encrypt messages for transmission to the provisioning agent using the agent's public key, and may decrypt messages transmitted from the agent to the device using the communication device's private key.

Another option, which may be applied instead of or in addition to encryption using their respective public-private keys, is for the communication device and the provisioning agent to establish a secure communications channel and mutually authenticate each other over an available transport mechanism. The secure channel may be established using the respective public-private key pairs of the communication device and the provisioning agent. The transport mechanism used for authentication and communications may be the same mechanism or it could be different. In one example, the transport mechanism for communication between the communication device and the provisioning agent could be an internet protocol such as IPv6, and the mechanism for authentication could be as specified in the protocol. Suitable examples include HIP, SSL, TLS, IPsec and the Datagram Transport Layer Security protocol (DTLS).

Once the communication device has been purchased or otherwise come into the ownership of a device owner 401, the device owner registers their ownership with the provisioning agent 200 (shown at 503). The owner could communicate with the provisioning agent directly via the agent's client interface 201. For example, the owner could communicate via a web interface, or via telephone, SMS, email etc. Alternatively, the user could register ownership using a programmatic interface, such as an API or UPI.

The registration process could involve tests of ownership that the owner must pass to register ownership of the device at the agent. For example, the owner could provide the agent with the device's unique identifier (e.g. the IPv6 address described above). To aid the owner in determining the devices identifier, the identifier could be printed on the device in some way during manufacture. For example, if the identifier is in the form of an IPv6 address, this could be printed onto the communication device. The provisioning agent then checks the database for the existence of the communication device and, if the provided identifier can be found in the database, the device will be marked as being owned by the device owner.

During registration of the communication device, the provisioning unit may record additional information about the owner in order to create a type of user account. For example, the provisioning agent may allow the user to enter personal details and create a password. By creating a user account, the provisioning agent can allow an owner to more conveniently manage the credentials stored on the communication device. This could be particularly useful if the owner owns multiple communication devices. Particularly for Internet of Things applications, it is therefore easy to envisage a situation in which a particular owner owns many communication devices, each of which may require service from a network. By allowing the owner to communicate directly with the provisioning agent, the owner can manage the network credentials of each of their devices by accessing their user account through a client interface with the provisioning agent, for example, through a web-page. If an owner owns multiple devices, the provisioning agent suitably configures its database accordingly to associate each of those multiple devices with a single owner.

At this stage in the example, the communication device is yet to receive any network credentials and so is still unable to access resources provided by any network operator over and above the ability to transmit a registration request to the network.

When an owner has purchased network service from a particular network operator, the owner of the terminal informs the provisioning agent 200 (shown at 504). This could be done using the same client interface 201 as was used to register ownership of the device. Alternatively, the owner could inform the agent that network service has been purchased from a particular network operator using a separate client interface. The owner preferably has a contract already in place with the network operator, and the provisioning unit may require the owner to provide proof of this contract before recording the network operator against the appropriate devices' records. Alternatively the provisioning agent may query the network operator for confirmation that the required contract is in place. Once the owner has informed the provisioning agent of the network operator from which the device is to access communication resources, the agent associates the owner's device with that network operator in its database. Each device may be associated with multiple network operators.

Once the owner of the device has purchased service from a network operator, the device will need credentials to enable it to access the network's resources. When the device initiates the registration process, it will have no credentials specific to the network operator from which it has just purchased service. If this is the first time that network service has been purchased for the device, then the device will have no credentials for any network operator stored thereon.

As part of the registration process the device transmits a registration request message to a communication network (shown at 505). The request message contains information that identifies the communication device 100 and the provisioning agent 200. For example, the request message could contain the device's and agent's public key. Alternatively, the registration request could contain the device's and agent's unique identifiers (e.g. in the form of encrypted pubic keys). In one enhancement the communication device's identifier may be encrypted with the public key of the provisioning agent before being incorporated in the request message in order to enhance privacy by preventing the communication device's unique identifier ever appearing in the clear over the air interface.

Although the device may not have any suitable network credentials installed at the time of sending the request message, the request message is suitably capable of being received and processed by any suitable communication network. Preferably, on receiving the request message, the communication network is configured to forward the message (or part or a derivation of it) onto the appropriate provisioning unit (506). Therefore, a suitable network is capable of responding to the registration message even if the network that receives the registration message is not the same network from which the owner of the device has purchased service. This is illustrated in FIG. 4. In this example, the device owner purchases network service from operator 403, but the registration request message is received by a different network operator 402. Upon receiving the registration request message, the network operator 402 requests that the provisioning unit provide the appropriate network credentials for the communication device to access the communication resources of its network operator (together with the resources of any network that operator has a roaming agreement with) (shown at 507 and 508). The network that receives the registration request suitably uses the identifier of the provisioning agent contained in the message to contact the appropriate agent for the required credentials In response to the request from the communication network, the provisioning unit 202 looks up the unique identifier of the communication device in its database to determine which network operators it is associated with. The provisioning agent then provides the network credentials necessary for the communication device to access communication resources from those network operators for installation on the device (509). For example in the case of a traditional cellular mobile operator his would involve installing the IMSI and Ki pre-shared secret on the communication device allowing traditional network authentication to take place on all subsequent attempts of the device to register on the network. As an alternative example, in the case of an OMI Lightweight M2M compliant communication device this might involve installing a shared secret or signed keys that can subsequently be used by the DTLS protocol to support the OMI protocols in subsequent communication with the network. The provisioning agent may generate the network credentials itself, or it may be provided with them by the network operator.

The necessary credentials are then transmitted from the provisioning agent to the communication device, where they may be stored in provisioning unit 205. Once the communication device has stored the credentials, it can use those credentials to access the communication resources of the network operator associated with those credentials. The credentials could be transmitted over the secure channel between the provisioning agent and the communication device. For enhanced security, the credentials could be encrypted by the provisioning agent using the communication device's pubic key. This encryption could be performed by the provisioning unit 202.

Although in the example described herein reference has been made to only one provisioning agent, in practice there may well be many provisioning agents in existence. A communication network is preferably able to identify from the registration message received from the communication device which provisioning agent is managing the credentials of that device.

The owner of a communication device may be able to change the network operator with which that device is associated at any time by informing the provisioning agent of the change. The provisioning agent may download any new network credentials to the communication device, which then replaces its existing credentials in memory with the new credentials. The provisioning agent may initiate this communication. Preferably the provisioning agent uses the unique identifier of the communication device in question to route the new network credentials to the device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for providing a communication device with network credentials, the method comprising:
   storing, on the communication device, an indication of an identity associated with the communication device, and an identity associated with a provisioning agent;
   transmitting, from the communication device to a communication network, a registration request that identifies the communication device and the provisioning agent, wherein the provisioning agent is different from and not part of a network operator, and the communication network is not operated by the network operator;
   receiving, by the provisioning agent, the registration request from the communication network;
   providing, by the provisioning agent in response to the registration request, network credentials to enable the communication device to access communication resources provided by a network operator associated with those credentials, wherein the network credentials comprise user rights to use certain resources of the network operator and wherein the provisioning agent for provisioning the user rights to the communication device is operator-independent; and
   transmitting said network credentials from the communication network to the communication device.

2. The method as claimed in claim 1, wherein the method comprises storing a public key of the communication device as the identity associated with the communication device.

3. The method as claimed in claim 2, further comprising encrypting at the provisioning agent said network credentials using the public key of the communication device.

4. The method as claimed in claim 1, wherein the method comprises storing a public key of the provisioning agent as the indication of the identity associated with the provisioning agent.

5. The method as claimed in claim 4, wherein the communication device encrypts an identifier of the communication device using the public key of the provisioning agent for inclusion in the registration request.

6. The method as claimed in claim 1, wherein the communication device and the provisioning agent establish a secure communications channel between them and the provisioning agent transmits the network credentials over that secure communications channel.

7. The method as claimed in claim 1, wherein the communication device applies a one-way mathematical function to the indication of its identity so as to generate an identifier of the communication device for inclusion in the registration request.

8. The method as claimed in claim 1, wherein the communication device applies a one-way mathematical function to the indication of the identity associated with the provisioning agent so as to generate an identifier of the provisioning agent for inclusion in the registration request.

9. The method as claimed in claim 1, further comprising identifying, at the provisioning agent, one or more network operators from which the communication device is permitted to access communication resources in dependence on an identifier of the communication device included in the registration request.

10. The method as claimed in claim 1, further comprising transmitting, from the communication device, the registration request at a time when there are no network credentials stored on the communication device.

11. A communication device comprising:
   a memory storing an indication of an identity associated with the communication device, and an identity associated with a provisioning agent;
   a communication unit configured to transmit, to a communication network, a registration request that identifies the communication device and the provisioning agent, wherein the provisioning agent is different from and not part of a network operator, and the communication network is not operated by the network operator; and
   a provisioning unit configured to store network credentials received from the communication network in response to the registration request and thereafter use said network credentials to access communication resources of a network operator associated with those network credentials, wherein the network credentials comprise user rights to use certain resources of the network operator, and wherein the provisioning agent for provisioning the user rights to the communication device that is accessed through the network operator is operator-independent.

12. The communication device as claimed in claim 11, wherein the memory is configured to store a private key of the communication device and wherein the communication device further comprises an encryption unit configured to decrypt communications from the provisioning agent using the communication device's private key.

13. The communication device as claimed in claim 11, wherein the memory is configured to store a public key of the provisioning agent as the indication of the identity associated with the provisioning agent, and wherein the communication device further comprises an encryption unit configured to encrypt communications for the provisioning agent using the provisioning agent's public key.

14. The communication device as claimed in claim 11, wherein the memory storing the indication of the identity associated with the communication device and the identity of a provisioning agent forms a soft subscriber identity module (SIM).

15. The communication device as claimed in claim 11, configured to store the indication of the identity associated with the communication device; and the identity associated with the provisioning agent in one-time-programmable memory, and to store the credentials and/or identifiers derived from the indications of the identities associated with the communication device and the provisioning unit in non-one-time-programmable memory.

16. A provisioning agent for providing a communication device with network credentials, the provisioning agent comprising:
   a client interface configured to receive, from a client associated with one or more communication devices, an indication of one or more network operators from which those communication devices are to be able to access communication resources;

a database configured to associate each of the one or more communication devices with an indication of the one or more network operators from which each communication device is able to access communication resources; and a provisioning unit configured to provide network credentials for installing on a first communication device to enable the first communication device to access communication resources from a first network operator of the one or more network operators, the first network operator being a network operator of a first communication network, and wherein the provisioning agent is distinct from and is not part of the one or more network operators, wherein the network credentials comprise user rights to use certain resources of the first network operator and wherein the provisioning agent for provisioning the user rights to the communication device that is accessed through the first network operator is operator-independent, and wherein the provisioning unit is configured to provide the network credentials in response to receiving a registration request from a second communication network that is not operated by the first network operator.

17. The provisioning agent as claimed in claim 16, wherein the database is configured to store a public key associated with each communication device, and wherein the provisioning unit is configured to encrypt the credentials for a particular communication device using the public key associated with that communication device.

* * * * *

UNITED STATES PATENT AND TRADEMARK OFFICE
CERTIFICATE OF CORRECTION

PATENT NO.         : 10,009,760 B2
APPLICATION NO.    : 14/694238
DATED              : June 26, 2018
INVENTOR(S)        : John Redford

Page 1 of 1

It is certified that error appears in the above-identified patent and that said Letters Patent is hereby corrected as shown below:

On the Title Page

Item (30) Foreign Application Priority Data, Line 1, delete "2015" and insert --2014--.

Signed and Sealed this
Second Day of October, 2018

Andrei Iancu
*Director of the United States Patent and Trademark Office*